US010007893B2

(12) United States Patent
Emmerson

(10) Patent No.: US 10,007,893 B2
(45) Date of Patent: *Jun. 26, 2018

(54) METHODS FOR ONLINE COLLABORATION

(71) Applicant: Parker M. D. Emmerson, Chapel Hill, NC (US)

(72) Inventor: Parker M. D. Emmerson, Chapel Hill, NC (US)

(73) Assignee: BLOG BAND, LLC, Chapel Hill, NC (US)

( * ) Notice: Subject to any disclaimer, the term of this patent is extended or adjusted under 35 U.S.C. 154(b) by 517 days.

This patent is subject to a terminal disclaimer.

(21) Appl. No.: 14/611,471

(22) Filed: Feb. 2, 2015

(65) Prior Publication Data

US 2015/0154562 A1  Jun. 4, 2015

Related U.S. Application Data

(63) Continuation-in-part of application No. 13/916,494, filed on Jun. 12, 2013, now Pat. No. 8,962,964, which is a continuation-in-part of application No. 12/494,945, filed on Jun. 30, 2009, now Pat. No. 8,487,173.

(60) Provisional application No. 61/133,481, filed on Jun. 30, 2008.

(51) Int. Cl.
*G10H 1/00* (2006.01)
*G06Q 10/10* (2012.01)
*G06Q 20/12* (2012.01)
*G06Q 20/14* (2012.01)
*H04R 27/00* (2006.01)

(52) U.S. Cl.
CPC ....... *G06Q 10/101* (2013.01); *G06Q 20/1235* (2013.01); *G06Q 20/145* (2013.01); *G10H 1/0025* (2013.01); *G06Q 2220/18* (2013.01); *G10H 2220/091* (2013.01); *G10H 2240/175* (2013.01); *H04R 27/00* (2013.01); *H04R 2227/003* (2013.01)

(58) Field of Classification Search
CPC ...................................................... G10H 1/00
USPC .................................................. 84/600–602
See application file for complete search history.

(56) References Cited

U.S. PATENT DOCUMENTS

| 7,349,481 | B2 * | 3/2008 | Steentra | H04L 27/2602 375/260 |
| 7,649,136 | B2 * | 1/2010 | Uehara | G06Q 20/102 84/601 |
| 7,714,222 | B2 * | 5/2010 | Taub | G10H 1/0058 84/600 |

(Continued)

OTHER PUBLICATIONS

MyOnlineBand.com; (https://web.archive.org/web/20080405203320/http:/www.myonlineband.com/Help/MusicCollaboration.aspx; 2008; viewed online on Mar. 27, 2017.*

*Primary Examiner* — David Warren
(74) *Attorney, Agent, or Firm* — NEO IP

(57) ABSTRACT

Systems and methods for creating and editing collaborative music compositions via a computer network, including remote uploading tracks by musicians, and for creating and joining a band, wherein the system and methods provide for at least one musician to join a virtual group of at least one other musician for the purpose of virtual collaborative creating and/or editing music tracks remotely, via an online network and interactive website therefor.

25 Claims, 12 Drawing Sheets

(56) References Cited

U.S. PATENT DOCUMENTS

| | | | | |
|---|---|---|---|---|
| 8,283,546 B2* | 10/2012 | van Os | | G06F 17/30743 84/600 |
| 8,907,192 B2* | 12/2014 | Akiyama | | G10H 7/00 84/604 |
| 2001/0042056 A1* | 11/2001 | Ferguson | | G06Q 10/10 706/10 |
| 2002/0091847 A1* | 7/2002 | Curtin | | H04M 3/56 709/231 |
| 2002/0095392 A1* | 7/2002 | Ferguson | | G06Q 10/10 706/10 |
| 2002/0165921 A1* | 11/2002 | Sapieyevski | | G10H 1/0058 709/204 |
| 2003/0164084 A1* | 9/2003 | Redmann | | G10H 1/0058 84/615 |
| 2005/0115381 A1* | 6/2005 | Bryden | | A63J 17/00 84/600 |
| 2005/0120865 A1* | 6/2005 | Tada | | G10H 1/0058 84/600 |
| 2005/0173864 A1* | 8/2005 | Zhao | | G06Q 10/10 273/299 |
| 2005/0262989 A1* | 12/2005 | Franzblau | | G09B 5/02 84/470 R |
| 2006/0112814 A1* | 6/2006 | Paepcke | | G10H 1/0066 84/645 |
| 2006/0123976 A1* | 6/2006 | Both | | G10H 1/0058 84/600 |
| 2007/0028750 A1* | 2/2007 | Darcie | | G10H 1/0058 84/625 |
| 2007/0039449 A1* | 2/2007 | Redmann | | G10H 1/0058 84/609 |
| 2007/0044639 A1* | 3/2007 | Farbood | | G10H 1/0025 84/609 |
| 2007/0140510 A1* | 6/2007 | Redmann | | G10H 1/0058 381/97 |
| 2007/0218964 A1* | 9/2007 | Albers | | G10H 1/0025 455/701 |
| 2007/0255816 A1* | 11/2007 | Quackenbush | | G10H 1/0058 709/223 |
| 2007/0256551 A1* | 11/2007 | Knapp | | G09B 5/065 84/722 |
| 2008/0047413 A1* | 2/2008 | Laycock | | G09B 5/12 84/477 R |
| 2008/0060499 A1* | 3/2008 | Sitrick | | G09B 15/002 84/477 R |
| 2008/0060506 A1* | 3/2008 | Laycock | | G09B 5/12 84/645 |
| 2008/0190271 A1* | 8/2008 | Taub | | G10H 1/0058 84/645 |
| 2008/0201424 A1* | 8/2008 | Darcie | | H04N 7/15 709/204 |
| 2008/0208740 A1* | 8/2008 | Uehara | | G06Q 20/102 705/40 |
| 2008/0215681 A1* | 9/2008 | Darcie | | H04L 12/66 709/204 |
| 2008/0264241 A1* | 10/2008 | Lemons | | G10H 1/0025 84/601 |
| 2008/0271592 A1* | 11/2008 | Beckford | | G10H 1/0008 84/645 |
| 2009/0070420 A1* | 3/2009 | Quackenbush | | G06F 17/30 709/204 |
| 2009/0156179 A1* | 6/2009 | Hahn | | G06Q 10/101 455/414.1 |
| 2009/0172200 A1* | 7/2009 | Morrison | | G10H 1/0058 709/248 |
| 2009/0249944 A1* | 10/2009 | Ziv Av | | G06Q 30/02 84/609 |
| 2010/0057517 A1* | 3/2010 | Jerkins, Jr. | | G06Q 10/0637 705/7.36 |
| 2010/0058920 A1* | 3/2010 | Uehara | | G06Q 20/102 84/609 |
| 2010/0089223 A1* | 4/2010 | Ting | | G10H 1/361 84/610 |
| 2010/0121857 A1* | 5/2010 | Elmore | | G06F 17/30702 707/748 |
| 2010/0132536 A1* | 6/2010 | O'Dwyer | | G10H 1/0008 84/609 |
| 2010/0146405 A1* | 6/2010 | Uoi | | G06Q 10/10 715/756 |
| 2010/0212478 A1* | 8/2010 | Taub | | G10H 1/0058 84/645 |
| 2010/0319518 A1* | 12/2010 | Mehta | | G10H 1/0058 84/625 |
| 2010/0326256 A1* | 12/2010 | Emmerson | | G10H 1/0025 84/610 |
| 2012/0047216 A1* | 2/2012 | Rhie | | H04M 1/2478 709/206 |
| 2012/0065977 A1* | 3/2012 | Tepperman | | G10L 13/08 704/258 |
| 2012/0067195 A1* | 3/2012 | Skaggs | | G09B 15/026 84/477 R |
| 2012/0246584 A1* | 9/2012 | Beroukhim | | G06Q 30/02 715/763 |
| 2013/0000465 A1* | 1/2013 | Gurule | | G10H 1/0025 84/609 |
| 2013/0073359 A1* | 3/2013 | Caplan | | G06Q 30/06 705/14.16 |
| 2013/0310122 A1* | 11/2013 | Piccionielli | | G07F 17/3272 463/2 |
| 2014/0040119 A1* | 2/2014 | Emmerson | | G10H 1/0025 705/39 |
| 2015/0096433 A1* | 4/2015 | Watanabe | | G10H 1/383 84/613 |
| 2015/0154562 A1* | 6/2015 | Emmerson | | G06Q 10/101 705/59 |
| 2016/0055838 A1* | 2/2016 | Serletic, II | | G10L 25/48 704/260 |

* cited by examiner

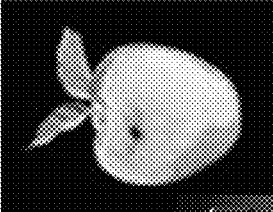

Band Profile
Ryan Eldridge and The New Shakers
Experimental, Alternative, Rock Click on an item to start

| | | |
|---|---|---|
| Center of Me 09/12/07 | tracks | plays: 37 |

A song I wrote about how it feels to come over an addiction.

| | | |
|---|---|---|
| Paper Memories 09/12/07 | tracks | plays: 40 |

An observation on the frailty of memory.

| | | |
|---|---|---|
| The Flower 09/12/07 | tracks | plays: 20 |

A song about how things aren't always as important as they seem.

Members
Ryan Eldridge - Singer
Parker Emmerson - Piano
Zach Davidson - Piano
Adam Sweet - Violin

Comments
I echo that of parker, I have been at school as well and will be participating more on this site more with the happening music that is going on here.
Posted Thu Jan 10, 2008 12:02pm by keyofz MyBlogBand | Bands | Musicians | Tutorial Username:
Password:
Forgot Password?
Register image gallery

Influences
Talking Heads, David Byrne, Black Star, Rufus Wainwright, Elvis Costello, Live, Steve Burns, Flaming Lips, De La Sol, Pat Walsh, Buddy Holly, Velvet Underground, The Yardbirds, Bing Crosby, Judy Garland

Figure 2

| MyBlogBand | Bands | Musicians | Tutorial |

Bands
Select up to 3 genres to find bands:

Please Select ▼    Any ▼

Any ▼

Search

Username:
Password:
Forgot Password?
Register

Figure 4

| MyBlogBand | Bands | Musicians | Tutorial |

Musicians

Instrument: [Any ▼]

Genre: [Any ▼]

Playing for at least [____] years

State: [Any ▼]

[Search]

Username: [____]
Password: [____]
Forgot Password?
Register

| MyBlogBand | Welcome | Bands | Musicians | Tutorial |
|---|---|---|---|---|

Welcome
Powerinthelines!

View my profile
Edit my profile
Change password
Manage my photos
Manage my music

Dr. Reckless Clinic
view band profile
edit band profile
manage band photos
manage band music

Manage Band Music

[player: Click on an item to start]

Rauchus 10/06/09 [edit] [song tracks]
Top of the Beat 03/10/11 [edit] [song tracks]
Live Love Listen 08/06/07 [edit] [song tracks]
Ivan Opus Scott II 04/09/07 [edit] [song tracks]
Domino 09/03/07 [edit] [song tracks]
some ideas. daron plays a sweet drum beat to this.
Nutmeg 07/21/10 [edit] [song tracks]
Has some room for other instruments. Sax or violin may be added at a later date.
To Turn in Dew [edit] [song tracks]
extra guitar and synth
My Town 12/19/07 [edit] [song tracks]
© Parker Emmerson and The Clinic
Paw Prints in the Snow 05/18/09 [edit] [song tracks]
Air Born 07/21/10 [edit] [song tracks]
Radial Infinity 06/24/10 [edit] [song tracks]

Description
The first Blogband to grace the web. Welcome, age of creative cyber collaboration. All music © The Clinic, Daron Whitmore, Julian Warren, Parker Emmerson, Lucy Martier, and Nathan Case-McDonald.

Figure 8

| MyBlogBand | Bands | Musicians | Tutorial |

Edit Band Profile

Welcome
Powerinthelines!

Name

View my profile
Edit my profile
Change password
Manage my photos
Manage my music Description:

Influences:

Start a band

Dr. Reckless
Clinic
Velvet Boys
secondary colors

Memorable Shows:

Primary Genre: [Please Select ▼]

Secondary Genre: [Please Select ▼]

Additional Genre: [Please Select ▼]

[Add]

Figure 9

| MyBlogBand | Bands | Musicians | Tutorial |

Welcome
Powerinthelines!

View my profile
Edit my profile
Change password
Manage my photos
Manage my music

Dr. Reckless Clinic
view band profile
edit band profile
manage band photos
manage band music

Tracks for Beltrang
by secondary colors

Click on an item to start

| | | | |
|---|---|---|---|
| beltang.mp3 | 07/05/07 11:07 am | Parker Emmerson | download |
| beltang.mp3 | 07/07/07 6:07 pm | Kelven Jimbo | |
| beltang.mid | 07/07/07 11:07 pm | John Belvin Tupelo | |

Choose File    Upload Track

Figure 10

STEP ONE

[ Username ]

[ Password ]

"Welcome to Blogband"

Presented within
"MyMixerBand"
Software on a MyPhone/
MyPad App

Step Two

Select: Upload to -

- Profile (My Music)
- Band 1
- Band 2
- Band 3
- New Band
- <--(Go Back to Login)

If profile, (My Music) is selected, go to Step 4.

(If a Band Was Selected, then Go Here): (Display Band Name)

Step Three:
- Song 1
- Song 2
- Song 3
- Upload as New Song
- <--(Go Back)

Step Four

Enter the Following:

Song Name:
Title:
Composer:
Key:
BPM:
Instrumentation:
CLICK TO UPLOAD
Automated entry based on file characteristics

Figure 12

METHODS FOR ONLINE COLLABORATION

CROSS-REFERENCE TO RELATED APPLICATIONS

This application is continuation-in-part of application Ser. No. 13/916,494, filed Jun. 12, 2013, which is a continuation-in-part of application Ser. No. 12/494,945, filed Jun. 30, 2009, which has the benefit of Application No. 61/133,481, filed Jun. 30, 2008, each of which is incorporated by reference herein in its entirety.

BACKGROUND OF THE INVENTION

Field of the Invention

The present invention relates generally to online music collaboration. Further, the present invention relates to methods for providing collaborative music compositions via a computer network.

Description of the Prior Art

It is known in the relevant art to provide for online music uploading and downloading. However, typically this is done for completed musical compositions. Some web-based options provide for musicians to collaborate on projects, but do not provide for collaborative groups or virtual bands. These sites provide for only one single track to be uploaded, not multiple tracks at the same or similar time from the same collaborative group. By way of example, there might be a guest member performing with an existing band on one track. Thus, there remains a need for online, collaborative group music compositions for multiple tracks. Also, there remains a need for selective grouping and multiple group collaborations on an ongoing basis with these methods.

SUMMARY OF THE INVENTION

A first aspect of the present invention is to provide methods for creating and editing collaborative music compositions via a computer network, including remote uploading tracks by musicians. Another aspect of the present invention provides methods for creating and joining a band, at least one musician to join a virtual group of at least one other musician for the purpose of virtual collaborative creating, and/or editing music tracks remotely, via an online network and interactive website therefor. Alternatively, the present invention may provide methods for coders or software programmers to virtually collaborate on software, either as a team or individually.

These and other aspects of the present invention will become apparent to those skilled in the art after reading the following description of the preferred embodiment when considered with the drawings, as they support the claimed invention.

BRIEF DESCRIPTION OF THE DRAWINGS

FIG. 2 provides a band profile GUI for a website according to the present invention.

FIG. 4 provides a band search GUI for a website according to the present invention.

FIG. 5 provides a musician search GUI for a website according to the present invention.

FIG. 6 provides a musician's music GUI for a website according to the present invention.

FIG. 8 provides a band music management GUI for a website according to the present invention.

FIG. 9 provides a band profile creation GUI for a website according to the present invention.

FIG. 10 provides a GUI for managing a song and the associated tracks according to the present invention.

FIG. 12 provides steps of uploading contents to the Myblogband network via an application.

DETAILED DESCRIPTION

Figure 1:
FIG. 1 provides a home page GUI for a website operating according to one embodiment of the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

The present invention provides a method for creating and editing collaborative music compositions via a computer network, including remote uploading tracks by musicians. Additionally, the present invention provides methods for creating and joining a band, allowing at least one musician to join a virtual group of at least one other musician for the purpose of virtual collaborative creating and/or editing music tracks remotely, via an online network and interactive website therefor. Another embodiment of the present invention provides a method for creating and editing collaborative software programs via a computer network, including remote uploading of code by software programmers. The present invention provides for automated systems for providing online music composition including: an interactive website accessible from a remote computer device via a network, the website being operable for receiving a first track uploaded through the network from a first remote source, the first track created by at least one musician entity; the website further operable for automatically saving and categorizing the at least one track according to the musician entity and a music genre; the website further operable for receiving a second track from a second remote source, the second track created by a second musician entity, selectively combining the first track and the second track, and saving the combined tracks for creating a collaborative music composition. Preferably, the system is accessible remotely via a multiplicity of musician entities for uploading, editing, and creating collaborative music compositions selectively with other musician entities; remote access is based upon user accounts for the musician entities and their corresponding virtual bands, when they exist. The website is operable to provide for any of the musician entities to access and edit the collaborative music composition via network connection to the interactive website. Another embodiment of the website could provide for any coder or software programmer to access and edit the collaborative software composition via network connection to the interactive website.

Furthermore, the present invention provides for methods for providing online music composition including the steps of: providing an interactive website accessible with a remote computer via a network, wherein the website is operable for receiving a first track from a first remote source, the first track being created by at least one musician entity, saving and categorizing the at least one track according to musician and genre, receiving a second track from a second remote source, the second track created by a second musician entity, selectively combining the first track and the second track, and saving the combined tracks for creating a collaborative music composition.

Also the present invention provides for methods for online music collaboration including the steps of: providing an interactive website accessible with at least one remote computer device via a network, wherein the website is operable for receiving a first track from a first remote source, the first track being created by at least one musician entity, saving and categorizing the at least one track according to musician and genre, receiving a second track from a second remote source, the second track created by a second musician entity, selectively combining the first track and the second track, and saving the combined tracks for creating a collaborative music composition; and wherein the musician entities are self-selectively combinable to form at least one virtual band for online music creation, editing, and social network-based distribution through the interactive website.

Incorporation of attributes of contemporary social networks are further included in the present invention, including but not limited to: "friends," "fans," blogs, photos, videos, "like to share," and update/RSS feeds. Additionally, the present invention may be embedded as an app into social network sites. Automatic scripting (syncing of a social network with the invention) may link the two accounts (*e.g., allow access to the invention through Facebook, Google or Twitter, or vice versa), such as through the use of an internet OpenID.

The methods further include the steps of editing the combined tracks, and the interactive website is operable for receiving a multiplicity of tracks from more than one remote musician entity. Advantageously, the interactive website system and methods of the present invention are operable for automatically categorizing the virtual bands based upon a track categorization of composite tracks and/or based upon a musician categorization of any or all of the at least one musician entities that contribute at least one track to the composite track.

Definitions and defined terms, applicable to methods or systems of the inventions described herein, include but are not limited to the following:

The term "visitor" means any person who views the website.

The term "user" means any person, collection of persons, or entity who successfully registers with the website, or any band, virtual band or other collection of users.

The term "track" means any music track, whether create by one or more musicians, whether created online or offline, whether comprised of new music, combinations of previous tracks, edits of previous tracks or combinations of new music with previously-made tracks.

The term "song" means any collection of one or more tracks, the collection being represented by one track, designated as the song-track, which by default is set to play on the player, download, or be added to a playlist when a song is selected. In one embodiment of the invention, a user may add a song to a playlist without leaving the page where the user accesses the song. In another embodiment of the invention, a song is the equivalent of a folder housing one or more track files created by member(s) and/or guest member(s) of a virtual band, said folder having one track designated as the song-track.

The term "listener" means any user who is not a musician, band or virtual band.

The term "musician" means any user who uploads a unique track, creates a musician profile page, or is the member or guest member of a band.

The term "band" means any group of one or more musicians self-identified as a collective of musicians.

The term "virtual band" means any group of one or more musicians self-selectively combinable to collaborate musically to create at least one song.

The term "band member" means any musician who is the member of a band or virtual band.

The term "producer" is any user who posts a track, song, or playlist for download on the user's profile page.

The term "contributor" is any user who creates any item on the website, wherein the term item includes tracks, songs, or playlists. A contributor may be the musician(s) that create a song or track, or the producer of a playlist, or the musician(s) who created song(s) or track(s) included in a playlist.

The term "lyricist" is any musician who composes the words or lyrics for a track or song.

The terms "public accessibility" and "public availability" refer to any item on the website being so designated to be made available to any user or visitor so that they may download an item, play an item, add an item to a playlist, or a combination thereof.

The terms "private accessibility" and "private availability" refer to any item on the website being so designated to be made available only to a select group of users having the right to download an item, play an item, add an item to a playlist, or a combination thereof.

The terms "paid accessibility" and "paid availability" refer to any item on the website being so designated to be made available to a user in exchange for a fee being paid by the user, thereby granting the user the right to download an item, play an item, add an item to a playlist, or a combination thereof.

Referring now to the drawings in general, the illustrations are for the purpose of describing a preferred embodiment of the invention and are not intended to limit the invention thereto.

Typically, according to the present invention, music tracks are composed, produced, and uploaded by at least one musician, often a single musician, to the site via an interactive website accessible through a GUI viewable on a display. The display is constructed and configured for interactive user inputs and audiovisual outputs through a computer device, such as a computer having access to the website via a network, such as the Internet. In one embodiment, the user accesses the website via a browser running on a computer device. Furthermore, as the description below primarily refers to a website, any of the below functions and descriptions are disclosed as further being applied to any application, software, or software-as-a-service that can be accessed through a device having a display.

Regarding methods for the present invention, a web-based graphic user interface (GUI) is provided with interactive functionality so that a user can enter personalized information, customize the content displayable on the user's profile page, and provide for messaging and commenting services. Upon registering with the website, either through the GUI or another method, a user's login for the website may be comprised of a user identification or email address and a password, which is used to uniquely identify the user's profile and/or account. Each user is either a musician or a listener having a unique and customizable profile or is a collection of at least one users having a unique profile. Collections of users may include, but are not limited to, a band, virtual band, or group, whose profile may be customized by an admin designated to represent the user collection or may be customized by all users or a subset of users belonging to the collection.

Once registered, a user may post comments to a profile page and message other users. Additionally, the user may personalize their own profile page by providing and editing, amongst other items, bibliographic information, interests, and photos. By way of example and not limitation, a musician may include information such as genres that represent their music, instruments they play and their associated experience, past band and venue experience, and other information. Musicians and bands may further upload and/or add music to their profile page, including tracks, songs, and playlists. Listeners may also create playlists and post to their page. Further, uploaded photos may be managed, reordered, associated with other users, songs, tracks, or playlists, identified as the profile page main photo, shared, and/or downloaded, if the user allows for downloads and shares. In another embodiment of the invention coders and software programmers may add code and upload photos to their profile page.

After registration, users may view other user or band profiles, view, listen, review and/or download music, create customized playlists, message other users, comment on photos, tracks, songs, and playlists, and share photos and music, amongst other actions. Each user and associated profile page is given access to a GUI-accessible messaging system. The messaging system can be provided in numerous embodiments, included but not limited to self-contained real-time and/or email messaging systems, or real-time and/or email messaging systems integrated with third party software(s) and/or device(s). When the interface is viewable through a mobile device, one embodiment of this invention allows for messaging to occur within the mobile device's own application, thereby storing the messages on the mobile device itself. In one embodiment of the invention, users may share comments, photos, music, profiles or any other features or data of the website to a number of social media websites or third-party applications, such as those used for music composition. Notably, tracks downloaded or emailed from this invention's GUI can be easily mixed offline. In another embodiment, software programmers and coders may access the GUI through a mobile device and have messages stored on the mobile device itself.

Any user may create customized playlist(s) by selecting music available on the website that is publically available, or, if granted access, privately available music as well. By visiting user or band profile pages within the website, music in the form of tracks, songs, or playlists may be click-selected and added to the user's particular customized playlist. These playlists may be private, viewable only to the user and any other invited users, or public and available to all users and visitors via the user's homepage. In this manner, a user may create a plurality of playlists, each click-selection able to added to any one or plurality of playlists. Further, a user can selectively add or copy another user's entire playlist and/or a band or musician's playlist, so long as the playlist or each music selection has properties allowing for the playlist addition. These allowable properties may include whether the music is considered publically or privately available, whether the music is made available to be added to playlists specifically, and whether the user wishing to add the music to a playlist has provided any required compensation or granted any required access. Further, playlists, or portions thereof, may be publically or privately available, effectively granting a user the additional quality of being a producer having revenue generation capabilities. In another embodiment of the present invention, code may be made publically or privately available.

In one embodiment of the invention a user may create a playlist or song in the form of a sound library. Alternatively, a sound library may be hosted by the website itself. Various track samples or contributions can be added to the sound library and made either publically or privately available.

In one embodiment of the invention, a streaming radio channel may be created by the user. The streaming channel may be accessible through the website or through a application specifically tailored for a mobile device. A user may create the streaming channel by selecting a particular genre or combination of genres, selecting a playlist, or band, or choosing parameters and allowing automatic creation of a channel based on the parameter selections.

In the methods of the present invention, musicians may register a band or create a virtual band through the GUI. A band can be created by a registerd user simply creating a band profile page and providing the relevant profile information, such as genre, images and other personalized information, as described above. A virtual band may be created by several methods. According to one embodiment of the present invention, anyone on the site can also audition to be in a band by uploading an independent track for a band to review or by uploading a track related to a band's song. The band members, song contributors, or subsets thereof, receive notification of the audition track upload so that the track may be reviewed. The band member, song contributor, or subsets thereof, can then accept or reject the auditioning musician and send a notification of that selection.

According to another embodiment of the present invention, musicians may also participate in bands by starting a band profile page and inviting other users to join. A band can be create to grant permission to one, some or all band or guest members to invite other users to join the band. Band members have access to all the tracks and uploads of other members of the band. One embodiment of the inventions permits band members to collectively approve changes through voting. In general, however, once a song is created, the song designations (revenue-sharing, etc.) are established and can only be changed later by vote of majority. In another embodiment of the present invention, software programmers may invite other programmers or coders to collaborate or accept invitations from other programmers or coders to collaborate.

The acceptance of a musician into a band may be as a full band member or as a guest member. The permissions and accessibilities of each are determined relative to the band profile settings, but a guest band member generally has less access and permissions than a band member. Particularly, a guest member is limited to modifications pertaining to the particular song, songs or playlist to which the guest member status is associated. A guest band member is a guest musician who is invited or who is accepted by the band via an audition to collaborate on a song, although the guest may be invited or accepted to collaborate on additional songs, individually. New members may be permitted to upload tracks to various songs, download and/or view private band tracks, designate track-songs, invite other users to join the band, request and review auditions, and/or edit the band profile page. Notably there is no limit to the amount of bands a user may join or be a member of for musical collaboration. Band members may view revenue, listen, download, and upload analytics through the band profile page. In another embodiment, a software programmer or coder may be a team member or be a guest team member.

Importantly, the musicians do not need to ever be in proximity or create a track contemporaneously; rather, the collective contributions through the site over time create the tracks and ultimately the song-track to represent the song to the public. As there can be multiple tracks within one song, and therefore multiple versions of a song, different combination of tracks may be provided collaboratively through the site from the same or different musicians. Tracks may be provided in a multitude of file formats and the invention may allow for the files to be converted, compressed, or remain in their original formats. Any or all of these tracks may be either privately or publicly available, as set by one, all, or a subset of the track or song collaborators; otherwise the first track added for a song may be deemed the song-track by default. Additionally, band and/or musicians may choose which tracks and/or songs may be displayed in the player on their profile page. Each uploaded track is provided with a title and an optional description by the user uploading the track, although this information may be edited at a later time. Tracks and songs may be searchable either publically or privately by the users of the invention. Depending on the settings, comments may be added, deleted, and edited by users for each track and song created. In another embodiment, software programmers or coders do not need to be in proximity or work on software contemporaneously.

In one embodiment of the invention, the user who uploads a first track of a song can opt to be the song owner or select which users or user-categorize are granted ownership. The song owner may choose to accept or reject any tracks or track versions uploaded into a song folder, designate a revenue plan for the song, edit certain song tracks, descriptions and titled, grant permissions to other users, and regulate the song and track's general usage and properties. In another embodiment of the present invention, a user who uploads the first code of a software program can opt to be the owner of that software program or grant ownership of that software program Although one embodiment of the invention permits tracks to be uploaded through the GUI of the invention, tracks may be also uploaded from a variety of devices or third party applications (such as GarageBand) by sending the track file to an associated song email address. Upon creation of a song, a band member or musician may optionally allow for the creation of an associated email address unique to that song. Once created, the present invention may optionally allow for tracks to be emailed as attachments to the song email address and automatically placed in the song folder for review. The song email address may be publically accessible or privately accessible. Additionally, the track may be automatically labeled according to genre, based on the composition of the virtual band, when placed in the song folder. If the the user does not have permission to automatically upload the track to the band or song, a reply may be sent informing the sender of the track of such. Further, one embodiment may allow for metadata to be delivered with or without a track file to be automatically uploaded and integrated into a user or virtual band profile. Such metadata may include a photo or video taken with a mobile device and associated with a particular playlist, track, song, or band.

Tracks, and particularly song-tracks, may be made available for download or sale by the band members, song creators, or song contributors. Varying tiers or degrees of public/private designations may be associated with each song or track. These designations are applied to whether the tracks are able to be played, downloaded, added to a playlist, bought, shared or viewed by band members, song creators, song contributors, all users or all visitors for free, permission or compensation. Varying combinations may be applied. For example, and not by limitation, a song-track may be freely available to add to a playlist, which must be granted permission by at least one band member who is not a guest. In another embodiment of the invention, code and software programs may be available for download or sale. Uploaded tracks and created songs may be categorized within at least one genre selection on the website. The present invention also provides for auto-generation of genre labels based upon the band member composition, contributor genre composition, or other factor considerations. In this manner, auto-upload of tracks through song email address may be automatically designated to a particular genre so that users and visitors can discover this new music immediately upon upload by search by genre. In another embodiment, code and software programs may also be categorized.

The present invention is illustrated by the interactive website for www.myblogband.com, which includes an Internet and mobile application with specific functionality for providing virtual collaboration for musicians for creating and editing composite music tracks from a multiplicity of remote musician entities. This interactive website application is operable to provide users with the ability to create and/or join a band remotely from the other musicians in the band, by accessing the site for collaboration via a network, such as the Internet in a virtual workspace for multiple users. In an alternative embodiment of the present invention, Internet and mobile applications with specific functionality for providing virtual collaboration for software programmers and coders is provided.

Referring now to the drawings specifically, FIG. 1 provides a home page GUI for a website operating according to one embodiment of the present invention. The figure discloses several interactive options for users and visitors, including a tutorial, profile creation and log-in functionality, tabs that link to search capabilities, and sections featuring bands, musicians, and songs that may be compiled and displayed according to their relevancy. By way of example, but not a limitation, the compilation of these displays may take into consideration the IP address of the visitor, profile characteristics of the user, any logged user or visitor history, recent events or trends, random generation methods, or a combination thereof.

Figure 3:
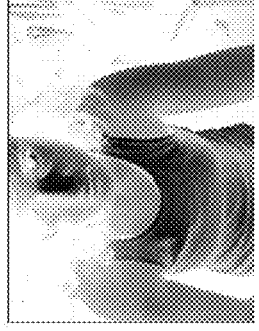
FIG. 3 provides a musician profile GUI for a website according to the present invention.

FIGS. 2 and 3 provides two embodiments of GUIs for users or visitors to view a selected band or virtual band profile page, including the songs and song information, genres, band member information, band information, band images, and related comments. The GUI also allows the user or visitor to listen, download, and add songs to playlists. Additionally, if available of the user or visitor, tracks for a song may be viewable.

FIGS. 4 and 5 provide two embodiments of GUIs for searching entities within the website. FIG. 4 provides an embodiment for searching for bands by music genre, whereas FIG. 5 provides an embodiment for searching for musicians by various criteria, including instrument, music genre, years of playing experience, and geographic location. A similar approach may be applied to musicians, virtual bands, listeners, or any other entity within the website. Additionally, other search criteria may be provided.

Figure 6:
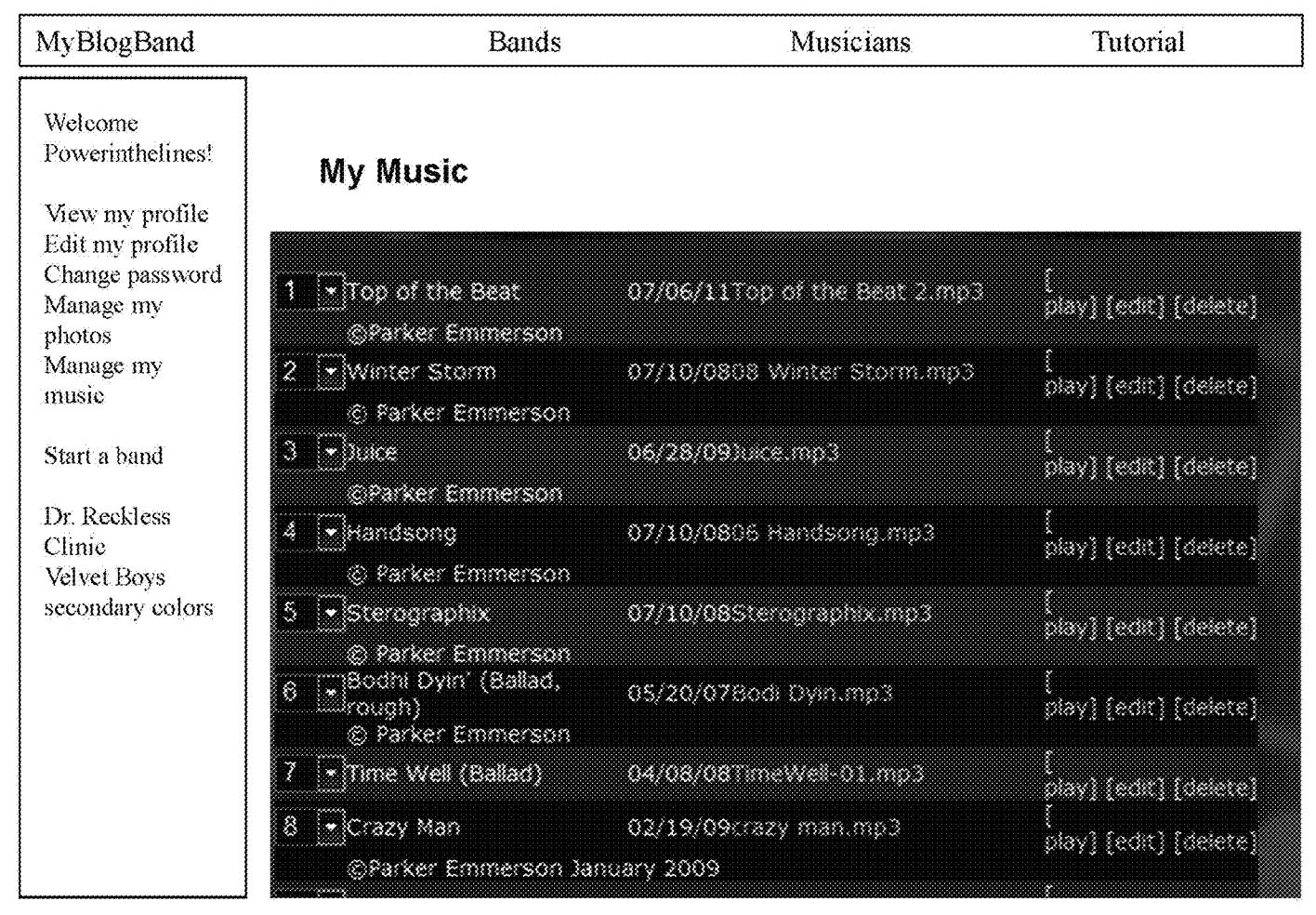

FIG. 6 provides one embodiment of a GUI for a registered user to manage the user's account or profile, including editing personal information, review options, photo management, music and playlist management, and a band creation option. Links to band or virtual band profile pages, of which the user is a member, guest member or fan, may be provided. In the embodiment disclosed in FIG. 6, a user's playlist, entitled "My Music," is displayed. Track and song options, such as playing, editing, deleting, downloading, sharing or other options, may be provided. Metadata, such as upload date, playlist date, file type, song genre or other data, may be provided. of entry or upload are also provided.

Figure 7:
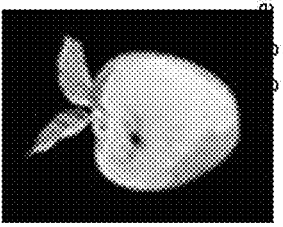
FIG. 7 provides another band profile GUI for a website according to the present invention.

FIG. 7 provides one embodiment of a GUI for a user to manage a band or virtual band. The songs and/or tracks may be individually listed with associated metadata, including but not limited to upload date, number of plays, popularity, or relevancy to the visitor. Additionally and if permitted by the song or track's attributes, download, add to playlist, or share options may be provided.

FIG. 8 provides one embodiment of a GUI for a for a band member to manage the band or virtual band music, including selection of tracks as song-tracks.

FIG. 9 provides one embodiment of a GUI for a for a band member to manage the band or virtual band profile information.

FIG. 10 provides one embodiment of a GUI for managing a song and the associated tracks. In FIG. 10, for illustration purposes, three tracks are shown, each track being separately uploaded by different musicians at different times.

Figure 11:
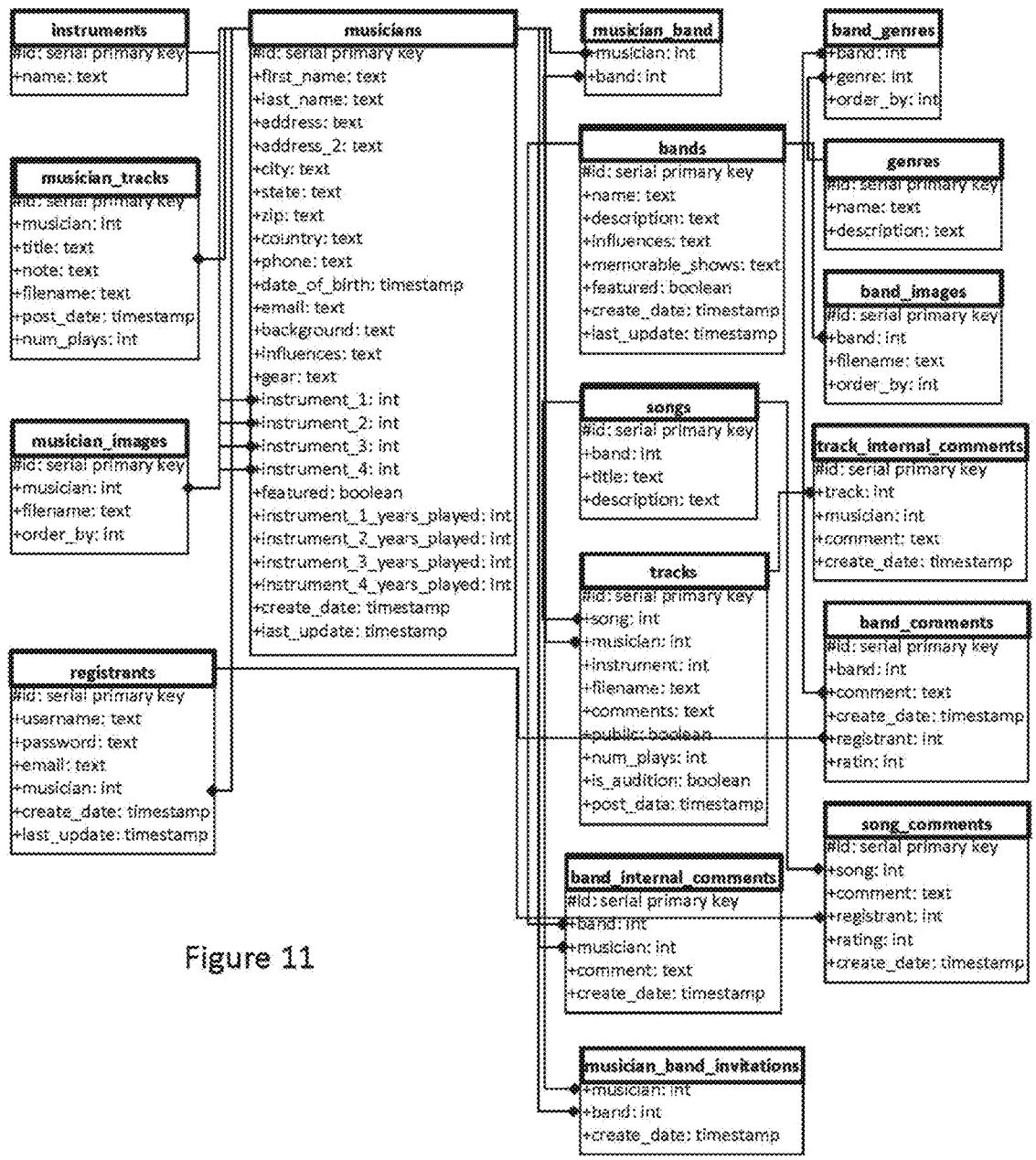
FIG. 11 provides a data table architecture of a website according to the present invention.

FIG. 11 provides a data table architecture of a website according to the present invention.

In-App Uploading to Myblogband

The streamlining of content to a website that uses the Blogband patented technology is a useful, unique feature that exemplifies the framework of Blogband's technology. There is a need to make it easy for people who are using a third party mixer, digital instrument or other recording and music creation software to upload their original content to the Blogband network and select exactly where it is placed within their accounts and within the social network. This is envisioned by giving the user access to a filing path system within the actual application ("app") running on a tablet, computer or mobile device. The filing path system is a representation of that user's content management system set up on the Blogband network with that user's profile and account accessible within the app for the purposes of uploading content. The file path is a representation of the user's Blogband network profile.

Content upload is thus facilitated with ease, because users can access their accounts within an app and also share content of the same mixer format. Files can be shared as lossless, compressed or as full mixer files of the respective application used to remotely edit content shared over the Blogband network. FIG. 12 illustrates the steps of uploading contents to the Myblogband network via an application.

Revenue Generation and Distribution.

A track, song-track, or playlist may be offered for sale through the present invention. A sale may grant the buyer permission to play the item, download the item, or add the item to a playlist. In one embodiment of the present invention the profit generated (revenue less costs) may be automatically distributed to the collaborators (band members, guest band members, musician, and/or producers) in a variety of ways. Costs may include any number of overhead, usage rights, or identified static costs associated with the site, collaborator, playlist, track, song, or third-party website, software provided or device. One embodiment of the present invention also offers interaction with other websites, including music-selling websites (e.g., iTunes, Amazon, CD Baby, etc.). In another embodiment of the present invention, licensing services may be offered to bands and musicians.

Licensing via bitcoin/myblogband social network.

There is a need in media industry especially for online music network to stop people from copying or downloading music for free. The invention here is to use an cryptocurrency network (e.g. a bitcoin network) to facilitate licensing of media be it video, audio or visual.

A custom-tailored cryptocurrency network is proposed for the express purpose of granting media licensing on the basis of distributed, cryptographic ledger technology. A license node has an up-to-date record of the presence of all licenses. A license authorization key is generated by the cryptographic network when a content owner/provider/generator receives payment via the aforementioned custom currency or other currency. Both the data for media and the license authorization key by which the data is allowed to be media are direct sent to a user on the network. Each user has a media wallet that can organize and categorize different kinds of licenses to different kinds of media using a multitude of cryptocurrency platforms including the cryptocurrency platform that has been custom-tailored to make media licensing easier.

Licenses generated over a cryptocurrency network have different purposes, such as granting right to perform a song, to play the song in a venue, to copy the song, to sell the song, and/or to distribute the song. There are multiple embodiments of licensing media over a cryptocurrency network.

One embodiment is to license media through a license node with individual licenses to particular pieces of media stored on a cloud server.

Given an individual piece of media, for example a song, entitled "Song 1," authorization to play the song, copy the song, transfer the song or sell the song would be granted using a license authorization key issued by a cryptocurrency network such as the bitcoin network/protocol. A user's online account would be credited with access to the media over a suite of different hardware/software platforms that have access to this data stored on "the cloud." License authorization keys that grant access to the media would be stored on the cloud and all the users would have to do is to log into their accounts. Users could transfer those license authorization keys to be stored locally on hardware. A "wallet" software is used to organize the license authorization keys that grant access to data, therefore turning it to consumable media. The wallet organizes both the data and license authorization keys as a cryptocurrency node on the cryptocurrency network via a GUI such that it is easily accessible through a browser. In this embodiment, the keys are still held on the cloud, so the media is accessible wherever the data is available so long as the user is logged into his cloud account.

By means of access to the cloud account, the user may transfer these licenses using a website or by having his local media wallet transfer the license authorization keys from the cloud server to another wallet or cloud account. Any format of media may be transferred.

The cryptocurrency network maintains the history of all transfers/transactions that take place. Data is downloaded from many different distributors and platforms, with the downloading/receiving of data, license authorization keys to access the data are also conferred to a user with a public address. The license authorization keys are held on a cloud server or local disk. Both the data and the license authorization keys are made available to the user through his "media wallet."

Once the user has the data, the license authorization key or the balance which is enshrined by the cryptocurrency network at a particular address grants access to the data, thereby turning it into media, because a centralized or distributed database of media files verifies the presence of the correct keys at the cryptocurrency node through either proof of stake (proof that there is the presence of the key) or transfer of the key one time per media usage to the owner's own wallet.

Another embodiment is to license media with individual licenses to a host of media stored on a cloud server. The owner of a license authorization key that corresponds to the correct respective value on a cryptocurrency network is also granted access to a subscription style service of media.

Yet another embodiment is to license media through a license node with individual licenses to particular pieces of media stored on a local server/computer/hard-drive/wallet. Data is downloaded and locally stored license authorization keys grant access. The license authorization keys can be transferred from one address to another address on a cryptocurrency network or the balance located at an address that signifies access to the data can be sent to another address, and thus access to the media is conferred.

Yet another embodiment is to license media content through a license node with individual licenses to a host of media stored locally.

The allocation of revenue can be modified according to users' preferences, including, but not limited to an equal distribution of profits by percentage to each collaborator, a tiered distribution of profits by percentage to each collaborator, or a tiered distribution having fixed distribution amounts extracted before distribution to other collaborators. Further, the distribution schemes may include additional users or exclude certain collaborator or collaborator types. Additionally, the profit allocation may be remitted in numerous forms, including but not limited to peer-to-peer digital currency such as Bitcoin, foreign currency, through a third-party account or ACH, held in a user account created through the website, and/or through a physical check. Conversion from any native currency to any foreign or account currency may be available, optionally at an additional cost to the payor of a fee or the receiver of a profit. Additionally, user-agreed upon barter systems may be established, with the optional integration of the aforementioned remittance methods or services being integrated. Third party services such as PayPal and Bitcoin can be integrated into the website GUI for ease-of-use. Any of these services may have associated additional costs. In another embodiment of the invention, these services may also be available for an interactive website for virtual software collaboration.

In one embodiment of the invention, featured bands, songs, and/or musicians may be displayable on the homepage or within advertising space throughout the website. The inclusion of particular music or users into these featured displays may be based on merit, such as "likes," downloads, plays, or other properties, or may based on fees paid. Furthermore, competitions, awards, and prizes may be created and displayed in various areas of the website. In another embodiment, featured programmers or software programs may be displayable on the homepage or within advertising space throughout the website. Competitions, awards, and prizes may also be available for programmers and coders on a website providing methods for virtual software collaboration.

Another embodiment of the invention may incorporate permit real-time functions and software such as a visualizer that can connect to the playing of music, real-time audio, video and/or text communication, and virtual jam sessions. By providing virtual access to users through the website GUI, virtual band members may create virtual tracks and live concerts by recording live sessions or by combining uploaded tracks with live, real-time recordings.

Certain modifications and improvements will occur to those skilled in the art upon a reading of the foregoing description. By way of example and not limitation, methods for providing a filing system for playlists or collections of tracks that provides for multiple musician and/or multiple group collaborations as set forth hereinabove. Also, a business model including the methods hereinabove wherein advertising is sold for generating targeted traffic for music, including the use of musical keywords wherein each music genre has keywords specifically associated with it so that advertisements can address niche markets related to those genres. The above mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for creating a virtual band for providing online music composition comprising:
   an interactive website constructed and configured in communication with a server; and
   at least two musician entities being self-selectively combinable to form the virtual band to collaborate musically to create at least one song;
   wherein the interactive website is accessible by at least one device via network communication;
   wherein the interactive website is further capable of receiving at least one track created offline by the at least two musician entities;
   wherein the at least one track is operable to be given a property of being the at least one song by the at least two musician entities;
   wherein the interactive website is operable for permitting a visitor to the interactive website to register as a user, the user being a musician entity or a listener;
   wherein the interactive website is operable for allowing the user to create a playlist comprised of tracks, songs, or a combination thereof;
   wherein a fee is collected from consumers of at least one item on the interactive website and a profit from the fee is distributed to at least one contributor of the at least one item;
   wherein the at least one item is operable to be given an accessibility by the at least one contributor;
   wherein the at least one item is selected from the group consisting of the at least one track, the at least one song, the tracks in the playlist, the songs in the playlist, and the playlist;
   wherein the at least one contributor is at least one of the at least two musician entities who created the at least one track and the at least one song, musicians who created the tracks and the songs in the playlist, or the user who created the playlist;
   wherein the profit is distributed to the at least one contributor of the at least one item: equally by percentage; according to a first tier system in which the profit is distributed by percentage; or according to a second tier system in which the profit is distributed by amount; and
   wherein the fee is converted from a native currency to a desired currency and the profit is distributed to the at least one contributor in the desired currency.

2. The system of claim 1, wherein the visitor to the interactive website comprises a visitor directed to the interactive website from another website.

3. The system of claim 1, wherein the at least two musician entities are capable of self-selecting genre labels and the at least one track is automatically labeled with a genre label based on the genre labels of the at least two musician entities that created the at least one track.

4. The system of claim 1, wherein the interactive website automatically receives a track upon the track being sent to an associated song email address, wherein the associated song email address has either public accessibility or private accessibility.

5. The system of claim 1, wherein the at least one track is automatically converted from a native file format to a file format compatible with the interactive website.

6. The system of claim 1, wherein a musician entity, upon invitation by a musician entity of a virtual band, or upon a successful audition for the virtual band, becomes a guest member of the virtual band, the guest member being able to collaborate on a selected song, thereby becoming a contributor on the selected song.

7. The system of claim 1, wherein a track or a version of a track uploaded into a song folder is operable to be accepted or rejected by the at least one contributor.

8. The system of claim 7, wherein the track or the version of the track is uploaded via an actual application running on a tablet, a computer or a mobile device, and wherein the actual application provides access to a filing path system.

9. The system of claim 8, wherein the filing path system is a content management system set up by a user on the interactive website with a profile and an account of the user accessible within the actual application.

10. The system of claim 1, wherein the desired currency is a peer-to-peer digital currency.

11. The system of claim 1, wherein the fee is collected from licensing services for media provided by bands and musicians.

12. The system of claim 11, further comprising a custom-tailored cryptocurrency network for facilitating the licensing services based on distributed cryptographical ledger technology.

13. The system of claim 12, wherein the bands and musicians providing media receive payment from a user via the custom-tailored cryptocurrency network, data is downloaded by the user and a license authorization key is generated for the user with a particular address over the custom-tailored cryptocurrency network.

14. The system of claim 13, wherein the license authorization key turns the data into consumable media.

15. A method for creating, organizing and managing a virtual band, comprising:
providing a system comprising a server in communication with an interactive website accessible by at least one remote device over network communication;
the interactive website receiving a first track created off-line by a first musician entity;
a second musician entity selectively downloading and combining the first track with at least a second track;
the interactive website receiving a combined track from the second musician entity;
the first musician entity and the second musician entity forming the virtual band by self-selection for online music creation, editing, and social network-based distribution through the interactive website;
the virtual band giving the combined track a property of being a song;
the interactive website collecting a fee from consumers of the combined track on the interactive website;
the interactive website converting the fee from a native currency to a desired currency; and
the interactive website distributing a profit from the fee to the first music entity and the second music entity in the desired currency: equally by percentage; according to a first tier system in which the profit is distributed by percentage; or according to a second tier system in which the profit is distributed by amount.

16. The method of claim 15, further comprising the virtual band determining an accessibility to the combined track, and wherein the accessibility is public, private, paid, or a combination thereof.

17. The method of claim 15, further comprising:
the virtual band selecting at least one genre label; and
the combined track automatically being labeled with a genre label based on the at least one genre label selected by the virtual band.

18. The method of claim 15, further comprising a third musician entity, upon invitation by the first or second musician entity of the virtual band, or upon a successful audition for the virtual band, becoming a guest member of the virtual band, wherein the guest member is operable to collaborate on a selected song, thereby becoming a contributor on the selected song.

19. The method of claim 15, further comprising: the interactive website receiving the first track via a song email address to which the first track was sent, wherein the song email address has either public accessibility or private accessibility.

20. The method of claim 19, further comprising the first track being automatically converted from a native file format to a file format compatible with the interactive website.

21. The method of claim 15, further comprising distributing the profit in a form of peer-to-peer digital currency.

22. The method of claim 15, further comprising collecting the fee from licensing services for the combined track.

23. The method of claim 22, further comprising a custom-tailored cryptocurrency network facilitating the licensing services based on distributed cryptographical ledger technology.

24. The method of claim 23, further comprising the bands and musicians providing media, receiving payment from a user with a particular address via the custom-tailored cryptocurrency network, and granting the user to download a data and a license authorization key over the custom-tailored cryptocurrency network.

25. The method of claim 24, further comprising the license authorization key turning the data into consumable media.

* * * * *